ic text
(12) United States Patent
Lian

(10) Patent No.: US 11,386,287 B2
(45) Date of Patent: Jul. 12, 2022

(54) METHOD AND APPARATUS FOR COMPUTER VISION

(71) Applicant: Nokia Technologies OY, Espoo (FI)

(72) Inventor: Xuhang Lian, Tianjin (CN)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 15/734,658

(22) PCT Filed: Jun. 26, 2018

(86) PCT No.: PCT/CN2018/092809
§ 371 (c)(1),
(2) Date: Dec. 3, 2020

(87) PCT Pub. No.: WO2020/000171
PCT Pub. Date: Jan. 2, 2020

(65) Prior Publication Data
US 2021/0124990 A1    Apr. 29, 2021

(51) Int. Cl.
*G06K 9/62*    (2022.01)
*G06N 3/04*    (2006.01)
(Continued)

(52) U.S. Cl.
CPC ......... *G06K 9/6232* (2013.01); *G06K 9/6256* (2013.01); *G06N 3/04* (2013.01); *G06N 3/084* (2013.01); *G06V 20/56* (2022.01)

(58) Field of Classification Search
CPC .. G06K 9/6232; G06K 9/6256; G06K 9/6273; G06N 3/04; G06N 3/084;
(Continued)

(56) References Cited

U.S. PATENT DOCUMENTS

2016/0379109 A1* 12/2016 Chung ................ G06F 15/7803
706/26
2017/0046616 A1    2/2017 Socher et al.
(Continued)

FOREIGN PATENT DOCUMENTS

CN    105938559 A    9/2016
CN    107643826 A    1/2018
(Continued)

OTHER PUBLICATIONS

Chen, "DeepLab: Semantic Image Segmentation with Deep Convolutional Nets, Atrous Convolution, and Fully Connected CRFs" arXiv 2017. (Year: 2017).*
(Continued)

*Primary Examiner* — Juan A Torres
(74) *Attorney, Agent, or Firm* — Harness, Dickey & Pierce, P.L.C

(57) ABSTRACT

The method may include processing, by using a neural network, input feature maps of an image to obtain output feature maps of the image. The neural network may include a convolution part and/or a pooling part, and an aggregation part. The convolution part may include at least one parallel unit each of which contains two parallel paths, each path of the two parallel paths contains two cascaded convolution layers. The kernel sizes are 1 dimension and are different in different units. The pooling part includes at least one parallel unit each of which contains two parallel paths, each path of the two parallel paths contains two cascaded pooling layers. The size of filters of pooling is 1 dimension and is different in different units. The aggregation part is configured to concatenate results of the convolution part and/or the pooling part to obtain the output feature maps of the image.

15 Claims, 9 Drawing Sheets

(51) Int. Cl.
*G06N 3/08* (2006.01)
*G06V 20/56* (2022.01)

(58) Field of Classification Search
CPC ...... G06N 3/063; G06N 3/0454; G06V 20/56; G06V 10/82; G06V 20/10; G06V 20/70
USPC .......................................................... 382/157
See application file for complete search history.

(56) References Cited

U.S. PATENT DOCUMENTS

| | | | |
|---|---|---|---|
| 2017/0259801 A1 | 9/2017 | Abou-Nasr et al. | |
| 2018/0060719 A1 | 3/2018 | Kisilev et al. | |
| 2019/0244100 A1* | 8/2019 | Seo ...................... | G06N 3/0454 |
| 2020/0380689 A1* | 12/2020 | Chen ....................... | G06T 7/136 |

FOREIGN PATENT DOCUMENTS

| | | |
|---|---|---|
| CN | 107748895 A | 3/2018 |
| WO | WO-2016/033506 A1 | 3/2016 |

OTHER PUBLICATIONS

Szegedy Christian et al: "Rethinking the Inception Architecture for Computer Vision", 2016 IEEE Conference on Computer Vision and Pattern Recognition (CVPR), IEEE, Jun. 27, 2016 (Jun. 27, 2016), pp. 2818-2826, XP033021462, DOI: 10.1109/CVPR.2016.308 [retrieved on Dec. 9, 2016].

Wang Panqu et al: "Understanding Convolution for Semantic Segmentation", 2018 IEEE Winter Conference on Applications of Computer Vision (WACV), IEEE, Mar. 12, 2018 (Mar. 12, 2018), pp. 1451-1460, XP033337768, DOI: 10.1109/WACV.2018.00163 [retrieved on May 3, 2018].

Szegedy Christian et al: "Going deeper with convolutions", 2015 IEEE Conference on Computer Vision and Pattern Recognition (CVPR), IEEE, Jun. 7, 2015 (Jun. 7, 2015), pp. 1-9, XP032793421, DOI: 10.1109/CVPR.2015.7298594 [retrieved on Oct. 14, 2015].

Search Report for European Application No. 18924895.8 dated Jan. 4, 2022.

International Search Report PCT/ISA/210 for International Application No. PCT/CN2018/092809 dated Feb. 26, 2019.

* cited by examiner

500

502

Processing, by using a neural network, input feature maps of an image to obtain output feature maps of the image, wherein the neural network comprises a convolution part and/or a pooling part, and an aggregation part, the convolution part and/or the pooling part are configured to process the input feature maps respectively, the convolution part comprises at least one parallel unit each of which contains two parallel paths, each path of the two parallel paths contains two cascaded convolution layers, kernel sizes of the two cascaded convolution layers of a first path of the two parallel paths are 1*k and k*1 respectively and kernel sizes of the two cascaded convolution layers of a second path of the two parallel paths are k*1 and 1*k respectively, k is a positive integer greater than 1 and k in different unit is different, the pooling part comprises at least one parallel unit each of which contains two parallel paths, each path of the two parallel paths contains two cascaded pooling layers, the two cascaded pooling layers of a first path of the two parallel paths have filters of size 1*p and p*1 respectively, the two cascaded pooling layers of a second path of the two parallel paths have filters of size p*1 and 1*p respectively, p is a positive integer greater than 1 and p in different unit is different, the aggregation part is configured to concatenate results of the convolution part and/or the pooling part to obtain the output feature maps of the image

Training the neural network by a back-propagation algorithm

---
604

Enhancing an image

---
606

Processing, by using a neural network, input feature maps of an image to obtain output feature maps of the image, wherein the neural network comprises a convolution part and/or a pooling part, and an aggregation part, the convolution part and/or the pooling part are configured to process the input feature maps respectively, the convolution part comprises at least one parallel unit each of which contains two parallel paths, each path of the two parallel paths contains two cascaded convolution layers, kernel sizes of the two cascaded convolution layers of a first path of the two parallel paths are 1*k and k*1 respectively and kernel sizes of the two cascaded convolution layers of a second path of the two parallel paths are k*1 and 1*k respectively, k is a positive integer greater than 1 and k in different unit is different, the pooling part comprises at least one parallel unit each of which contains two parallel paths, each path of the two parallel paths contains two cascaded pooling layers, the two cascaded pooling layers of a first path of the two parallel paths have filters of size 1*p and p*1 respectively, the two cascaded pooling layers of a second path of the two parallel paths have filters of size p*1 and 1*p respectively, p is a positive integer greater than 1 and p in different unit is different, the aggregation part is configured to concatenate results of the convolution part and/or the pooling part to obtain the output feature maps of the image

Fig.6

METHOD AND APPARATUS FOR COMPUTER VISION

CROSS-REFERENCE TO RELATED APPLICATIONS

This application is a national phase under 35 U.S.C. § 371 of PCT International Application No. PCT/CN2018/092809 which has an International filing date of Jun. 26, 2018, the entire contents of each of which are hereby incorporated by reference.

FIELD OF THE INVENTION

Embodiments of the disclosure generally relate to information technologies, and, more particularly, to computer vision.

BACKGROUND

Computer vision is a field that deals with how computers can be made for gaining high-level understanding from digital images or videos. Computer vision plays an important role in many applications. Computer vision systems are broadly used for various vision tasks such as scene reconstruction, event detection, video tracking, object recognition, semantic segmentation, three dimensional (3D) pose estimation, learning, indexing, motion estimation, and image restoration. As an example, computer vision systems can be used in video surveillance, traffic surveillance, driver assistant systems, autonomous vehicle, traffic monitoring, human identification, human-computer interaction, public security, event detection, tracking, frontier guards and the Customs, scenario analysis and classification, image indexing and retrieve, and etc.

Semantic segmentation is tasked with classifying a given image at pixel-level to achieve an effect of object segmentation. The process of semantic segmentation may be to segment an input image into regions, which are classified as one of the predefined classes. The predicted result of the semantic segmentation can provide a broad range of kinds of information of a scene, such as categories, locations, shapes, relationships between objects in the scene. The semantic segmentation may have wide applications in semantic parsing, scene understanding, human-machine interaction (HMI), visual surveillance, Advanced Driver Assistant Systems (ADAS), unmanned aircraft system (UAS), robot sensing, and so on. For example, applying semantic segmentation on captured images, an image may be segmented into semantic regions, such as pedestrians, cars, buildings, tables, flowers, etc. When a proper query is given, object-of-interest and/or region-of-interest with the segmented information can be efficiently searched.

In an application of autonomous vehicles, understanding the scene such as road scene may be necessary. Given a captured image, the autonomous vehicle may be required to be capable of recognizing available road, lanes, lamps, persons, traffic signs, building, etc., and then the autonomous vehicle can take proper driving operation according to recognition results. The driving operation may have a dependency on a high performance of semantic segmentation. As shown in FIG. 1, a camera located on a top of a car may capture an image, and a semantic segmentation algorithm implemented in the autonomous vehicle may segment scene in the captured image into regions with a predefined number of classes such as classes: sky, building, pole, road marking, road, pavement, tree, sign symbol, fence, vehicle, pedestrian, bike, etc. The contents of the scene may provide a guideline for the autonomous vehicle to prepare next operation.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect of the present disclosure, it is provided a method. The method may comprise processing, by using a neural network, input feature maps of an image to obtain output feature maps of the image. The neural network may comprise a convolution part and/or a pooling part, and an aggregation part. The convolution part and/or the pooling part may be configured to process the input feature maps respectively. The convolution part may comprise at least one parallel unit each of which may contain two parallel paths, each path of the two parallel paths may contain two cascaded convolution layers, kernel sizes of the two cascaded convolution layers of a first path of the two parallel paths are 1*k and k*1 respectively and kernel sizes of the two cascaded convolution layers of a second path of the two parallel paths are k*1 and 1*k respectively, k is a positive integer greater than 1 and k in different unit is different. The pooling part may comprise at least one parallel unit each of which may contain two parallel paths, each path of the two parallel paths contains two cascaded pooling layers, the two cascaded pooling layers of a first path of the two parallel paths have filters of size 1*p and p*1 respectively, the two cascaded pooling layers of a second path of the two parallel paths have filters of size p*1 and 1*p respectively, p is a positive integer greater than 1 and p in different unit is different. The aggregation part may be configured to concatenate results of the convolution part and/or the pooling part to obtain the output feature maps of the image.

In an embodiment, the neural network may further comprise a first convolution layer connected with the at least one parallel unit of the pooling part and configured to reduce a number of channels of input feature maps of the image.

In an embodiment, the neural network may further comprise a second convolution layer connected with the aggregation part and configured to reduce a number of channels of feature maps output by the aggregation part.

In an embodiment, the first convolution layer and/or the second convolution layer may have a kernel size of 1*1.

In an embodiment, the neural network may further comprise an upsampling block connected with the second convolution layer and configured to upsample the feature maps output by the second convolution layer to a same size of the image.

In an embodiment, the upsampling block may be implemented by using Dense Upsampling Convolution.

In an embodiment, the neural network may further comprise a softmax layer connected with the upsampling block and configured to get a prediction from the feature maps output by the upsampling block.

In an embodiment, the neural network may further comprise a base neural network configured to process the image to obtain the input feature maps of the image.

In an embodiment, the base neural network may comprise one of ResNet neural network, DenseNet neural network, Xception neural network and VGG neural network.

In an embodiment, the neural network may be used for at least one of image classification, object detection and semantic segmentation.

In an embodiment, a stride of the pooling used in the pooling part is 1.

In an embodiment, the method may further comprise training the neural network by using a back-propagation algorithm.

In an embodiment, the method may further comprise enhancing the image.

According to another aspect of the disclosure, it is provided an apparatus. The apparatus may comprise at least one processor; and at least one memory including computer program code, the memory and the computer program code configured to, working with the at least one processor, cause the apparatus to execute the method according to the first aspect of the present disclosure.

According to still another aspect of the present disclosure, it is provided a computer program product embodied on a distribution medium readable by a computer and comprising program instructions which, when loaded into a computer, causes a processor to execute the method according to the first aspect of the present disclosure.

According to still another aspect of the present disclosure, it is provided a non-transitory computer readable medium having encoded thereon statements and instructions to cause a processor to execute the method according to the first aspect of the present disclosure.

These and other objects, features and advantages of the disclosure will become apparent from the following detailed description of illustrative embodiments thereof, which is to be read in connection with the accompanying drawings.

BRIEF DESCRIPTION OF THE DRAWINGS

FIG. 5 is a flow chart depicting a method according to an embodiment of the disclosure;

FIG. 6 is a flow chart depicting a method according to another embodiment of the disclosure;

DETAILED DESCRIPTION

Figure 1:
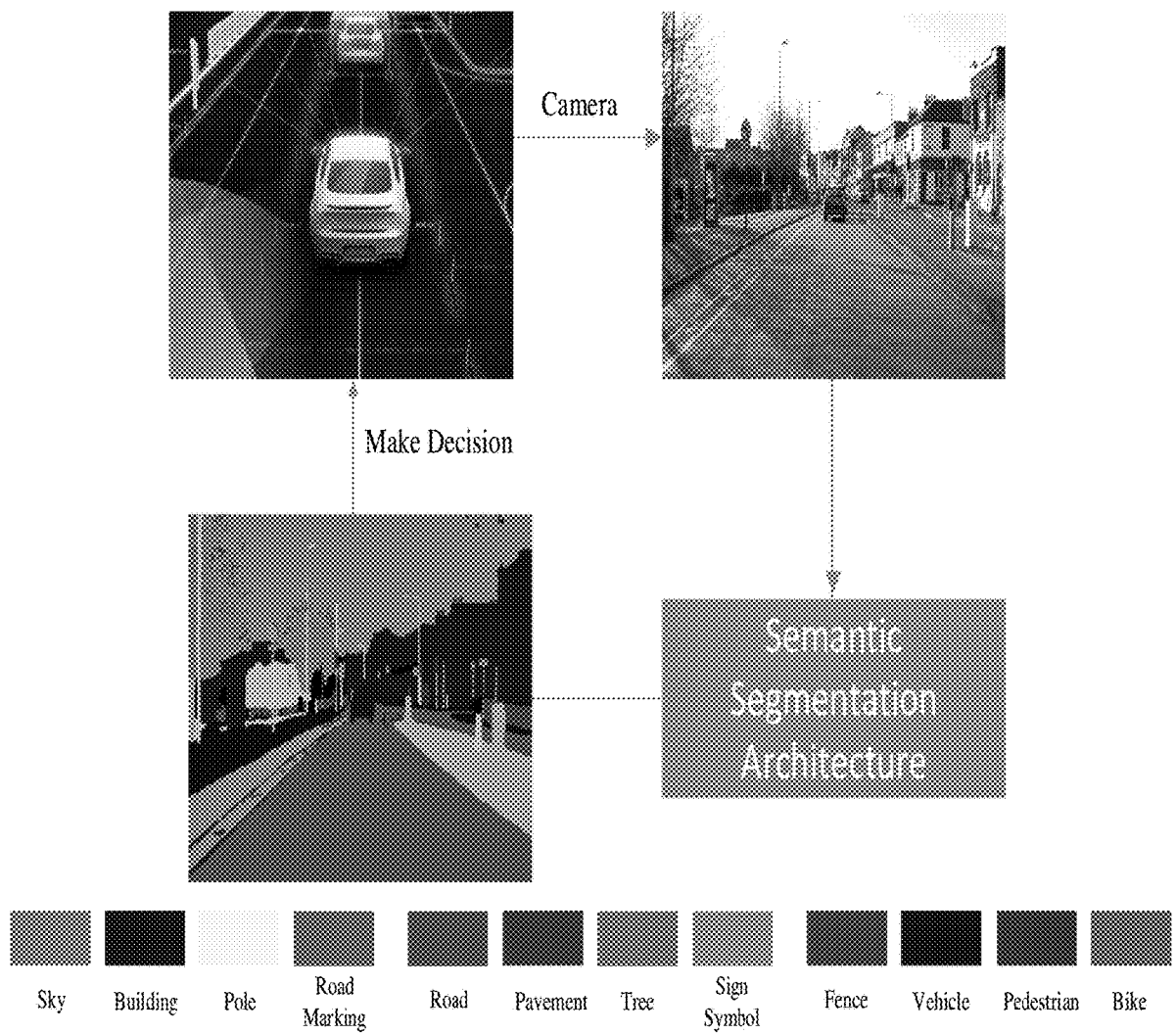
FIG. 1 schematically shows an application of scene segmentation on an autonomous vehicle.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

It is noted that though the embodiments are mainly described in the context of semantic segmentation, they are not limited to this but can be applied to various vision tasks that can benefit from the embodiments as described herein, such as image classification, object detection, etc.

The state of the art methods of semantic segmentation usually use a module/structure consisting of paralleling layers of Atrous Spatial Pyramid Pooling (ASPP) and pooling. ASPP is proposed by L. C. Chen, G. Papandreou, I. Kokkinos, K. Murphy and A. L. Yuille, "DeepLab: Semantic Image Segmentation with Deep Convolutional Nets, Atrous Convolution, and Fully Connected CRFs", IEEE Transactions on Pattern Analysis and Machine Intelligence, 2018, which is incorporated herein by reference in its entirety. The motivation of this module is to use the ASPP layers to aggregate context information and use pooling layers to aggregate global information. This module can improve an ability of the neural network to represent image with varying scales and effectively employ the global information.

However, there still exits some problems in this kind of structure. For example, the ASPP layers may leave out much detail information of feature maps. Each atrous layer of ASPP is implemented by enlarging the kernel of conventional 3*3 convolution, and filling positions among the evenly distributed nine points with non-zero values with zeros. This may make the information of the pixels of feature maps that correspond to these positions are not employed, which may lead to a serious loss of details in final predicted results. Another problem may be that though the pooling layers can accumulate the global information, it may neglect local information in the feature maps. Conventionally, the pooling layers in this module abstract the input feature maps into only a few pixels. As is known, the semantic information in high level layers of the network may be very rich and helpful for identifying detail parts of the input images. However, this kind of pooling layers makes much of information in the high level layers of the network are buried and not fully employed. As the same as the results of the ASPP layers, the results of this kind of pooling can only depict a rough shape of the object and lack the detail information.

To overcome at least one of the above problems and/or other problems, embodiments of the present disclosure propose a neural network which can make full use of the high level feature maps and maintain the details of objects.

Figure 2A:
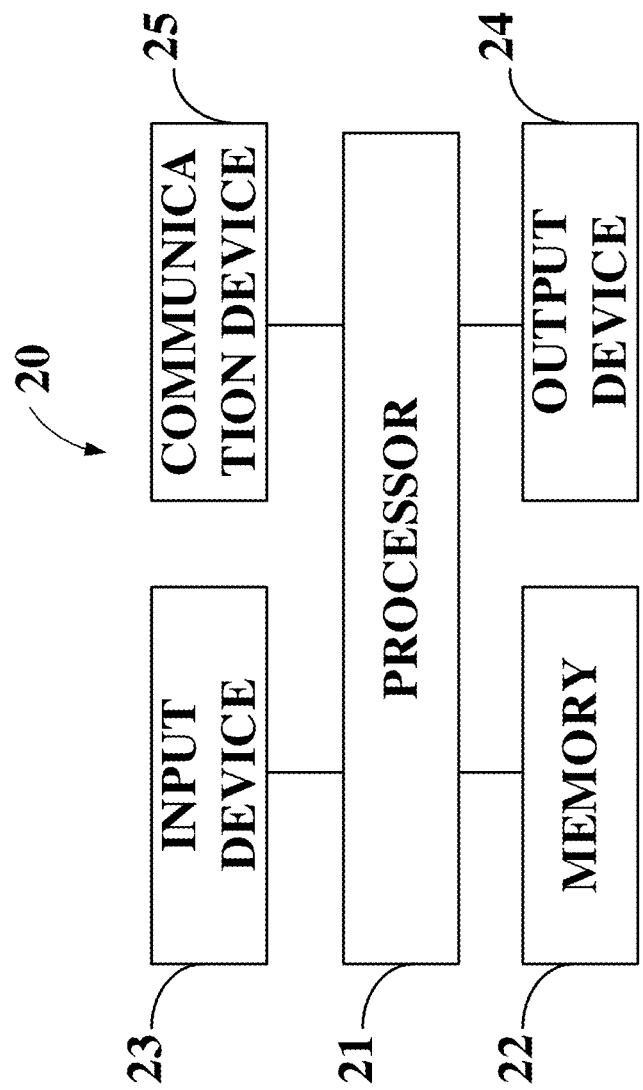
FIG. 2a is a simplified block diagram showing an apparatus in which various embodiments of the disclosure may be implemented.

FIG. 2a is a simplified block diagram showing an apparatus, such as an electronic apparatus 20, in which various embodiments of the disclosure may be applied. It should be understood, however, that the electronic apparatus as illustrated and hereinafter described is merely illustrative of an apparatus that could benefit from embodiments of the disclosure and, therefore, should not be taken to limit the scope of the disclosure. While the electronic apparatus 20 is illustrated and will be hereinafter described for purposes of example, other types of apparatuses may readily employ embodiments of the disclosure. The electronic apparatus 20 may be a user equipment, a mobile computer, a desktop computer, a laptop computer, a mobile phone, a smart phone, a tablet, a server, a cloud computer, a virtual server, a computing device, a distributed system, a video surveillance apparatus such as surveillance camera, a HMI apparatus, ADAS, UAS, a camera, glasses/goggles, a smart stick, smart watch, necklace or other wearable devices, an Intelligent Transportation System (ITS), a police information system, a gaming device, an apparatus for assisting people with impaired visions and/or any other types of electronic systems. The electronic apparatus 20 may run with any kind of operating system including, but not limited to, Windows, Linux, UNIX, Android, iOS and their variants. Moreover, the apparatus of at least one example embodiment need not to be the entire electronic apparatus, but may be a component or group of components of the electronic apparatus in other example embodiments.

In an embodiment, the electronic apparatus 20 may comprise processor 21 and memory 22. Processor 21 may be any type of processor, controller, embedded controller, processor core, graphics processing unit (GPU) and/or the like. In at least one example embodiment, processor 21 utilizes computer program code to cause an apparatus to perform one or more actions. Memory 22 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 22 may store any of a number of pieces of information, and data. The information and data may be used by the electronic apparatus 20 to implement one or more functions of the electronic apparatus 20, such as the functions described herein. In at least one example embodiment, memory 22 includes computer program code such that the memory and the computer program code are configured to, working with the processor, cause the apparatus to perform one or more actions described herein.

The electronic apparatus 20 may further comprise a communication device 25. In at least one example embodiment, communication device 25 comprises an antenna, (or multiple antennae), a wired connector, and/or the like in operable communication with a transmitter and/or a receiver. In at least one example embodiment, processor 21 provides signals to a transmitter and/or receives signals from a receiver. The signals may comprise signaling information in accordance with a communications interface standard, user speech, received data, user generated data, and/or the like. Communication device 25 may operate with one or more air interface standards, communication protocols, modulation types, and access types. By way of illustration, the electronic communication device 25 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 25 may operate in accordance with wireline protocols, such as Ethernet, digital subscriber line (DSL), and/or the like.

Processor 21 may comprise means, such as circuitry, for implementing audio, video, communication, navigation, logic functions, and/or the like, as well as for implementing embodiments of the disclosure including, for example, one or more of the functions described herein. For example, processor 21 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 20 among these devices according to their respective capabilities. The processor 21 thus may comprise the functionality to encode and interleave message and data prior to modulation and transmission. The processor 21 may additionally comprise an internal voice coder, and may comprise an internal data modem. Further, the processor 21 may comprise functionality to operate one or more software programs, which may be stored in memory and which may, among other things, cause the processor 21 to implement at least one embodiment including, for example, one or more of the functions described herein. For example, the processor 21 may operate a connectivity program, such as a conventional internet browser. The connectivity program may allow the electronic apparatus 20 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 20 may comprise a user interface for providing output and/or receiving input. The electronic apparatus 20 may comprise an output device 24. Output device 24 may comprise an audio output device, such as a ringer, an earphone, a speaker, and/or the like. Output device 24 may comprise a tactile output device, such as a vibration transducer, an electronically deformable surface, an electronically deformable structure, and/or the like. Output Device 24 may comprise a visual output device, such as a display, a light, and/or the like. The electronic apparatus may comprise an input device 23. Input device 23 may comprise a light sensor, a proximity sensor, a microphone, a touch sensor, a force sensor, a button, a keypad, a motion sensor, a magnetic field sensor, a camera, a removable storage device and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 20 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

Input device 23 may comprise an image capturing element. The image capturing element may be any means for capturing an image(s) for storage, display or transmission. For example, in at least one example embodiment, the image capturing element is an imaging sensor. As such, the image capturing element may comprise hardware and/or software necessary for capturing the image. In addition, input device 23 may comprise any other elements such as a camera module.

Figure 2B:
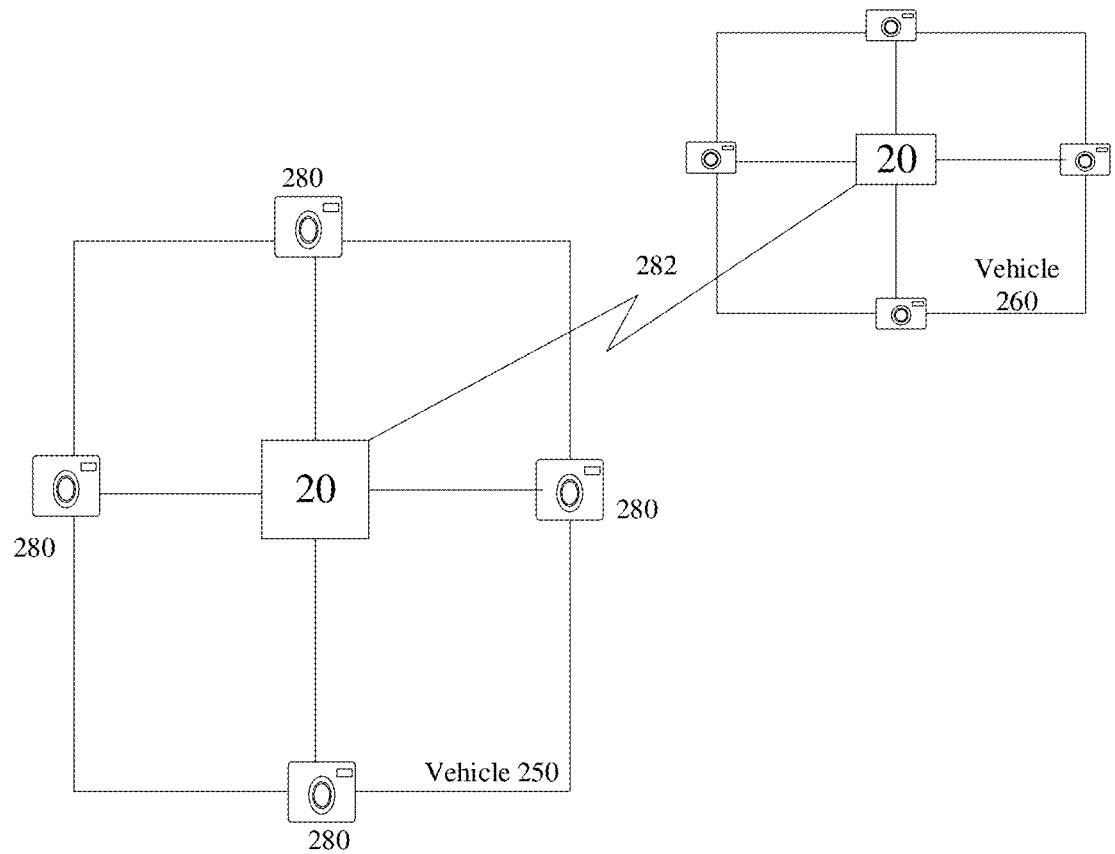
FIG. 2b is a simplified block diagram showing a vehicle according to an embodiment of the disclosure.

In an embodiment, the electronic apparatus 20 may be comprised in a vehicle. FIG. 2b is a simplified block diagram showing a vehicle according to an embodiment of the disclosure. As shown in FIG. 2b, the vehicle 250 may comprise one or more image sensors 280 to capture one or more images around the vehicle 250. For example, the image sensors 280 may be provided at any suitable locations such as the front, the top, the back and/or the side of the vehicle. The image sensors 280 may have night vision functionality. The vehicle 250 may further comprise the electronic apparatus 20 which may receive the images captured by the one or more image sensors 280. Alternatively the electronic apparatus 20 may receive the images from another vehicle 260 for example by using vehicular networking technology (i.e., communication link 282). The image may be processed by using the method of the embodiments of the disclosure.

For example, the electronic apparatus 20 may be used as ADAS or a part of ADAS to understand/recognize one or more scenes/objects such as available road, lanes, lamps, persons, traffic signs, building, etc. The electronic apparatus 20 may segment scene/object in the image into regions with classes such as sky, building, pole, road marking, road, pavement, tree, sign symbol, fence, vehicle, pedestrian, and bike according to embodiments of the disclosure. Then the ADAS can take proper driving operation according to recognition results.

In another example, the electronic apparatus 20 may be used as a vehicle security system to understand/recognize an object such as human. The electronic apparatus 20 may segment scene/object in the image into regions with a class such as human according to the method(s) of an embodiment of the disclosure. Then the vehicle security system can take one or more proper operations according to recognition results. For example, the vehicle security system may store and/or transmit the captured image, and/or start anti-theft system and/or trigger an alarm signal, etc. when the recognition results indicate that the captured image includes the object of human.

Figure 2C:
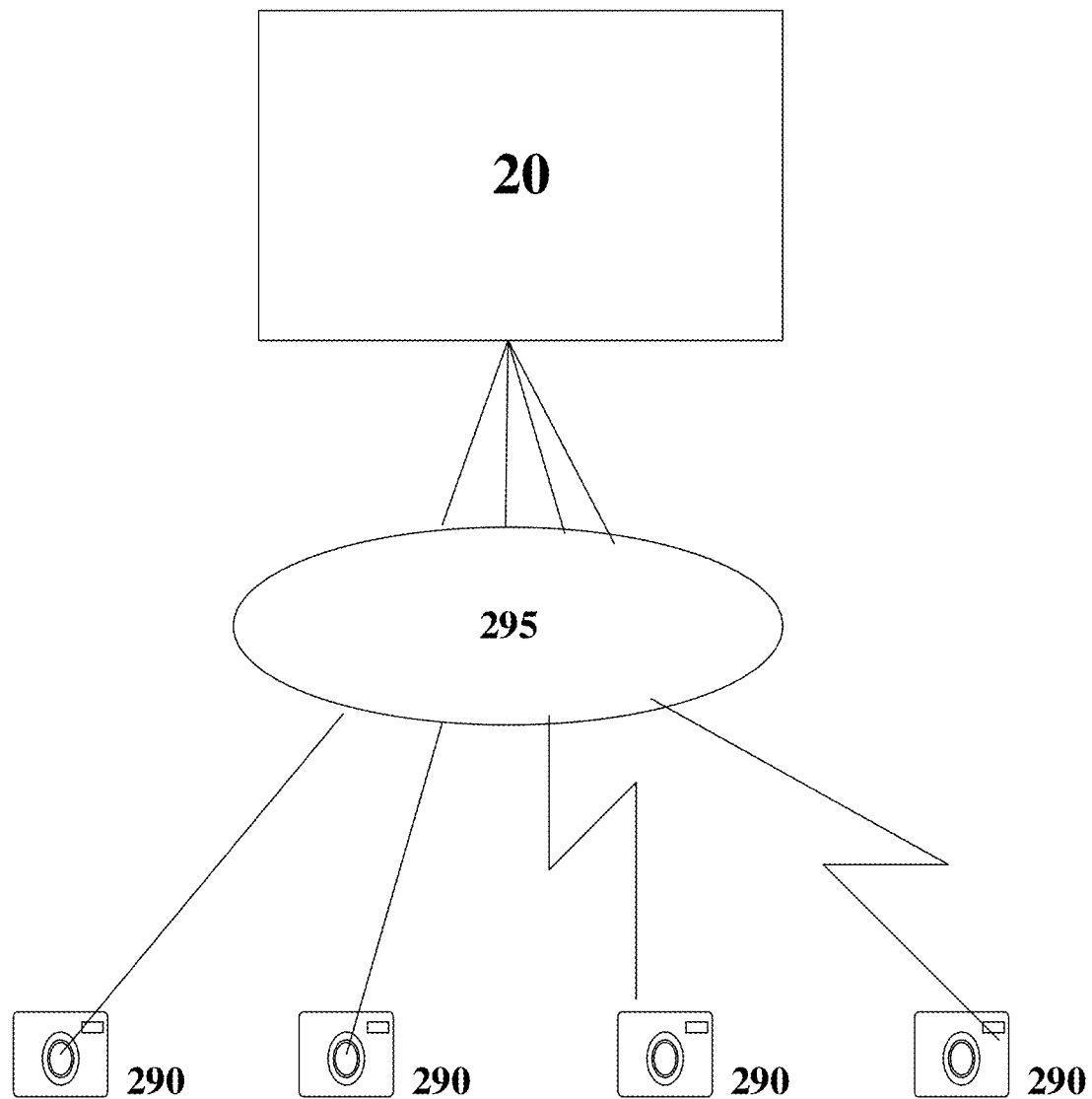
FIG. 2c is a simplified block diagram showing a video surveillance system according to an embodiment of the disclosure.

In another embodiment, the electronic apparatus 20 may be comprised in a video surveillance system. FIG. 2c is a simplified block diagram showing a video surveillance system according to an embodiment of the disclosure. As shown in FIG. 2c, the video surveillance system may comprise one or more image sensors 290 to capture one or more images at different locations. For example, the image sensors may be provided at any suitable locations such as the traffic arteries, public gathering places, hotels, schools, hospitals, etc. The image sensors may have night vision functionality. The video surveillance system may further comprise the electronic apparatus 20 such as a server which may receive the images captured by the one or more image sensors 290 though a wired and/or wireless network 295. The images may be processed by using the method of the embodiments of the disclosure. Then the video surveillance system may utilize the processed image to perform any suitable video surveillance task.

Figure 3:
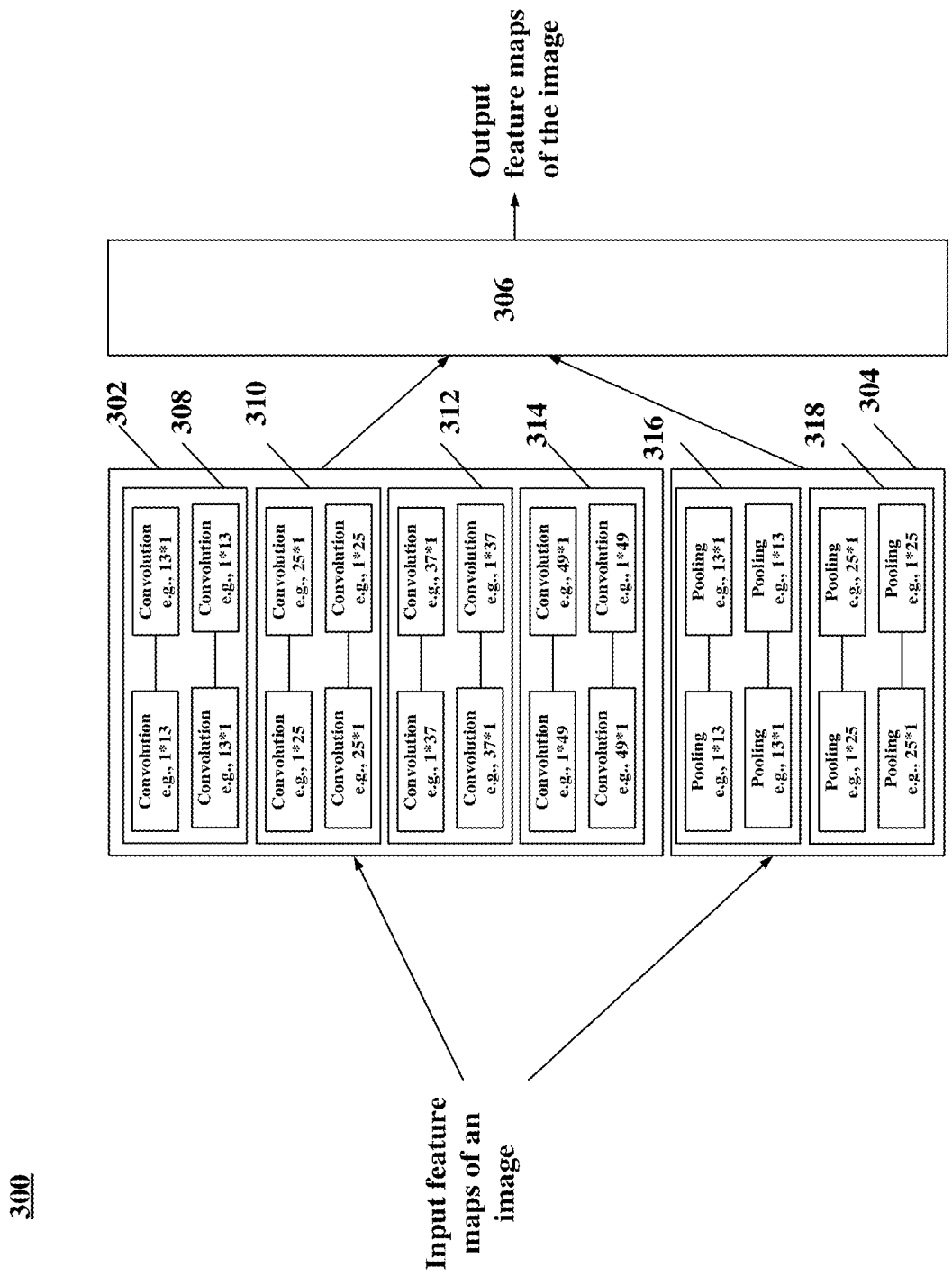
FIG. 3 schematically shows architecture of a neural network according to an embodiment of the disclosure.

FIG. 3 schematically shows architecture of a neural network according to an embodiment of the present disclosure. As shown in FIG. 3, the feature maps such as $$\frac{H}{8} \times \frac{W}{8} \times C$$

of an image may be fed into the neural network 300. Parameters H, W, C denote the height of an original input image, the width of the original input image, and the channel numbers of the feature maps respectively. The feature maps may be obtained by using various approaches. For example, the feature maps may be obtained from a base neural network such as ResNet, DenseNet, Xception, VGG, etc. The ResNet, DenseNet, Xception and VGG neural network are known by those skilled in the art, therefore the description thereof is omitted here for brevity.

The neural network 300 may comprise a convolution part 302 and/or a pooling part 304, and an aggregation part 306. The convolution part 302 may comprise at least one parallel unit such as four parallel units 308, 310, 312 and 314 shown in FIG. 3. The number of the at least one parallel unit may be determined by using various approaches. For example, the number of the at least one parallel unit may be predefined, depend on a specific vision task, determined by machine learning, or depend on performance of apparatus performing the vision task, etc. Each unit may contain two parallel paths. Each path may contain two cascaded convolution layers. The kernel sizes of the two cascaded convolution layers of a first path of the two parallel paths may be 1*k and k*1 respectively, and the kernel sizes of the two cascaded convolution layers of a second path of the two parallel paths may be k*1 and 1*k respectively. Parameter k may be a positive integer greater than 1. Parameter k in different unit may be different. Parameter k may be determined by using various approaches. For example, parameter k may be predefined, depend on a specific vision task, determined by machine learning, or depend on performance of apparatus performing the vision task, etc. For example, the kernel sizes of the two cascaded convolution layers in each unit may be $1*k^i$ and $k^i*1$ (i=1, 2, 3, 4, . . . ) where i is an index of the unit in the convolution part. Conversely, the kernel sizes of the two convolutions in the other path may be $k^i*1$ and $1*k^i$ (i=1, 2, 3, 4, . . . ). In an embodiment, the kernel sizes of the convolutions of unit 308 may be 1*13 and 13*1, the kernel sizes of the convolutions of unit 310 may be 1*25 and 25*1, the kernel sizes of the convolutions of unit 312 may be 1*37 and 37*1 and the kernel sizes of the convolutions of unit 314 may be 1*49 and 49*1.

The pooling part may comprise at least one parallel unit such as two parallel units 316 and 318 shown in FIG. 3. The number of the at least one parallel unit may be determined by using various approaches. For example, the number of the at least one parallel unit may be predefined, depend on a specific vision task, determined by machine learning, or depend on performance of apparatus performing the vision task, etc. Each of the two parallel units may contain two parallel paths. Each path of the two parallel paths may contain two cascaded pooling layers. The two cascaded pooling layers of a first path of the two parallel paths may have filters of size 1*p and p*1 respectively and the two cascaded pooling layers of a second path of the two parallel paths have filters of size p*1 and 1*p respectively. Parameters $p_1$ and $p_2$ may be determined by using various approaches. For example, parameters $p_1$ and $p_2$ may be predefined, depend on a specific vision task, determined by machine learning, or depend on performance of apparatus performing the vision task, etc. Parameter p may be a positive integer greater than 1. Parameter p in different unit may be different. For example, the two cascaded pooling layers of a first path of the two parallel paths may have filters of size $1*p^i$ and $p^i*1$ (i=1, 2, . . . ) respectively where i is an index of the unit in the pooling part. Conversely, the two cascaded pooling layers of a second path of the two parallel paths may have filters of size $p^i*1$ and $1*p^i$ (i=1, 2, . . . ) respectively. In an embodiment, the pooling layers of unit 316 may have filters of size 1*13 and 13*1 and the pooling layers of unit 318 may have filters of size 1*25 and 25*1.

The aggregation part 306 may be configured to concatenate results of the convolution part and/or the pooling part to obtain the output feature maps of the image. For example, if the convolution part 302 outputs n feature maps and the pooling part 304 outputs m feature maps, then the aggregation part 306 may concatenate results of the convolution part 302 and the pooling part 304 to obtain n+m output feature maps.

Figure 4:
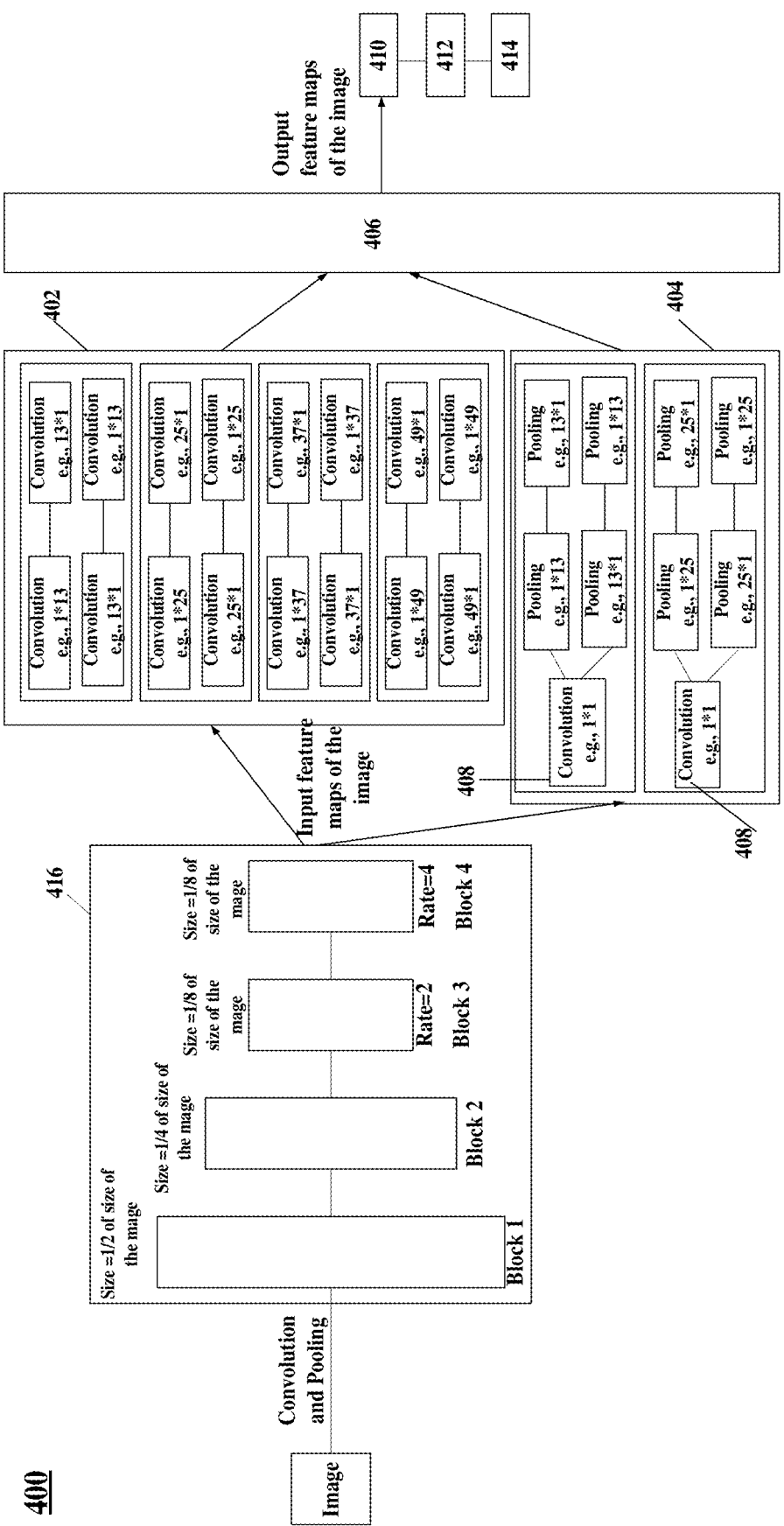
FIG. 4 schematically shows architecture of a neural network according to another embodiment of the disclosure.

FIG. 4 schematically shows architecture of a neural network according to another embodiment of the present disclosure. The neural network is similar to the neural network as described with reference to FIG. 3. For some same or similar parts which have been described with respect to FIG. 3, the description of these parts is omitted here for brevity.

As shown in FIG. 4, the neural network 400 may comprise a convolution part 402, a pooling part 404, and an aggregation part 406 which are same as the convolution part 302, the pooling part 304, and the aggregation part 306 shown in FIG. 3, and the description of these parts is omitted here for brevity.

In an embodiment, the neural network 400 may further comprise a first convolution layer 408. The first convolution layer 408 may be a 1*1 convolution or any other suitable convolution. The first convolution layer 408 may be connected with the at least one parallel unit of the pooling part 404 and configured to reduce a number of channels of input feature maps of the image. For example, each of the at least one parallel unit of the pooling part 404 may has respective first convolution layers 408 as shown in FIG. 4. Alternatively, there may be one first convolution layer 408 and its output may be fed into each of the at least one parallel unit of the pooling part 404 respectively. The reduced number of channels may be determined by using various approaches. For example, the reduced number of channels may be predefined, depend on a specific vision task, determined by machine learning, or depend on performance of apparatus performing the vision task, etc.

In an embodiment, the neural network 400 may further comprise a second convolution layer 410. The second convolution layer 410 may be a 1*1 convolution or any other suitable convolution. The second convolution layer 410 may be connected with the aggregation part 406 and configured to reduce a number of channels of feature maps output by the aggregation part 406. The number of channels of feature maps output by the aggregation part 406 may be reduced to any suitable number. For example, the second convolution layer 410 may adjust the number of the feature maps output by the aggregation part 406 to the total number of classes in the semantic segmentation task. For example, suppose there are 12 classes in the semantic segmentation task such as sky, building, pole, road marking, road, pavement, tree, sign symbol, fence, vehicle, pedestrian and bike, the second convolution layer 410 may adjust the number of feature maps output by the aggregation part 406 to 12.

In an embodiment, the neural network 400 may further comprise an upsampling block 412. The upsampling block 412 may be connected with the second convolution layer 410 and configured to upsample the feature maps output by the second convolution layer 410 to a same size of the image. The upsampling block may be implemented by using various upsampling approaches. For example, the upsampling block may be implemented by using Dense Upsampling Convolution proposed by Panqu Wang, Pengfei Chen, Ye Yuan, Ding Liu, Zehua Huang, Xiaodi Hou, Garrison Cottrell, "Understanding convolution for semantic segmentation", arXiv preprint arXiv:1702.08502, which is incorporated herein by reference in its entirety.

In an embodiment, the neural network 400 may further comprise a softmax layer 414. The softmax layer 414 may be configured to get a prediction from the output feature maps of the upsampling block 412.

In an embodiment, the neural network 400 may further comprise a base neural network 416 configured to process the image to obtain the feature maps of the image which may be fed into the convolution part 402 and the pooling part 404. The neural network 416 may be any suitable neural network such as ResNet neural network, DenseNet neural network, Xception neural network or VGG neural network.

As shown in FIG. 4, the neural network 416 may be a ResNet50 network. The input image first passes a convolution layer Conv1 and then is downsampled by a pooling layer Pool1 to ½ size of the original input image. Then the result of Pool1 is sequentially passed through Block1, Block2, Block3 and Block4. When the feature maps passes through Block 1 and Block 2, the size of the feature maps is downsampled respectively to ¼ and ⅛ of the original input image. In Block3 and Block4, atrous convolutions with dilation rate of 2 and 4 may be adopted respectively, and the size of feature maps produced by Block3 and Block4 are not changed.

FIG. 5 is a flow chart depicting a method according to an embodiment of the present disclosure. The method 500 may be performed at an apparatus such as the electronic apparatus 20 of FIG. 2a. As such, the apparatus may provide means for accomplishing various parts of the method 500 as well as means for accomplishing other processes in conjunction with other components. For some same or similar parts which have been described with respect to FIGS. 2a, 2b, 2c and FIGS. 3-4, the description of these parts is omitted here for brevity.

As shown in FIG. 5, the method 500 may start at block 502 where the electronic apparatus 20 may process, by using a neural network, input feature maps of an image to obtain output feature maps of the image. The neural network may be the neural network as described with reference to FIGS. 3-4.

As described above, the neural network may comprise a convolution part, a pooling part, and an aggregation part. The convolution part and/or the pooling part may be configured to process the input feature maps respectively.

The convolution part may comprise at least one parallel unit each of which contains two parallel paths. Each path of the two parallel paths may contain two cascaded convolution layers. Kernel sizes of the two cascaded convolution layers of a first path of the two parallel paths may be 1*k and k*1 respectively. Kernel sizes of the two cascaded convolution layers of a second path of the two parallel paths may be k*1 and 1*k respectively. k may be a positive integer greater than 1. k in different unit may be different.

The pooling part may comprise at least one parallel unit each of which may contain two parallel paths. Each path of the two parallel paths may contain two cascaded pooling layers. The two cascaded pooling layers of a first path of the two parallel paths may have filters of size 1*p and p*1 respectively. The two cascaded pooling layers of a second path of the two parallel paths may have filters of size p*1 and 1*p respectively. p may be a positive integer greater than 1. p in different unit may be different, The aggregation part may be configured to concatenate results of the convolution part and/or the pooling part to obtain the output feature maps of the image.

In an embodiment, the neural network may further comprise a first convolution layer connected with the at least one parallel unit of the pooling part and configured to reduce a number of channels of input feature maps of the image.

In an embodiment, the neural network may further comprise a second convolution layer connected with the aggregation part and configured to reduce a number of channels of feature maps output by the aggregation part.

In an embodiment, the first convolution layer and/or the second convolution layer may have a kernel size of 1*1.

In an embodiment, the neural network may further comprise an upsampling block connected with the second convolution layer and configured to upsample the feature maps output by the second convolution layer to a same size of the image.

In an embodiment, the upsampling block may be implemented by using Dense Upsampling Convolution.

In an embodiment, the neural network may further comprise a softmax layer connected with the upsampling block and configured to get a prediction from the feature maps output by the upsampling block.

In an embodiment, the neural network may further comprise a base neural network configured to process the image to obtain the input feature maps of the image.

In an embodiment, the base neural network may comprise one of ResNet neural network, DenseNet neural network, Xception neural network and VGG neural network.

In an embodiment, the neural network may be used for at least one of image classification, object detection and semantic segmentation.

In an embodiment, a stride of the pooling used in the pooling part is 1.

FIG. 6 is a flow chart depicting a method according to another embodiment of the present disclosure. The method 600 may be performed at an apparatus such as the electronic apparatus 20 of FIG. 2a. As such, the apparatus may provide means for accomplishing various parts of the method 600 as well as means for accomplishing other processes in conjunction with other components. For some same or similar parts which have been described with respect to FIGS. 2a, 2b, 2c and FIGS. 3-5, the description of these parts is omitted here for brevity. Block 606 is similar to block 502 of FIG. 5, therefore the description of this block is omitted here for brevity.

As shown in FIG. 6, the method 600 may start at block 602 where the electronic apparatus 20 may train the neural network by using a back-propagation algorithm. A training stage may comprise the following steps:

(1) Preparing a set of training images and their corresponding ground truth. The ground truth of an image indicates the class label of each pixel.

(2) Specifying the parameters of the base neural network, such as the number of layers, output stride, etc., wherein the base neural network may be configured to generate the feature maps of an image as the input of the proposed neural network. Specifying the parameters of the proposed neural network.

(3) With the training images and their ground truth, training the proposed neural network by a standard back-propagation algorithm. When the algorithm converges, the trained parameters of the proposed neural network can be used for various computer vision task such as image classification, object detection and semantic segmentation.

At block 604, the electronic apparatus 20 may enhance the image. For example, image enhancement may comprise at least one of removing noise, sharpening, brightening the image, making the image easier to identify key features, etc.

Figure 7:
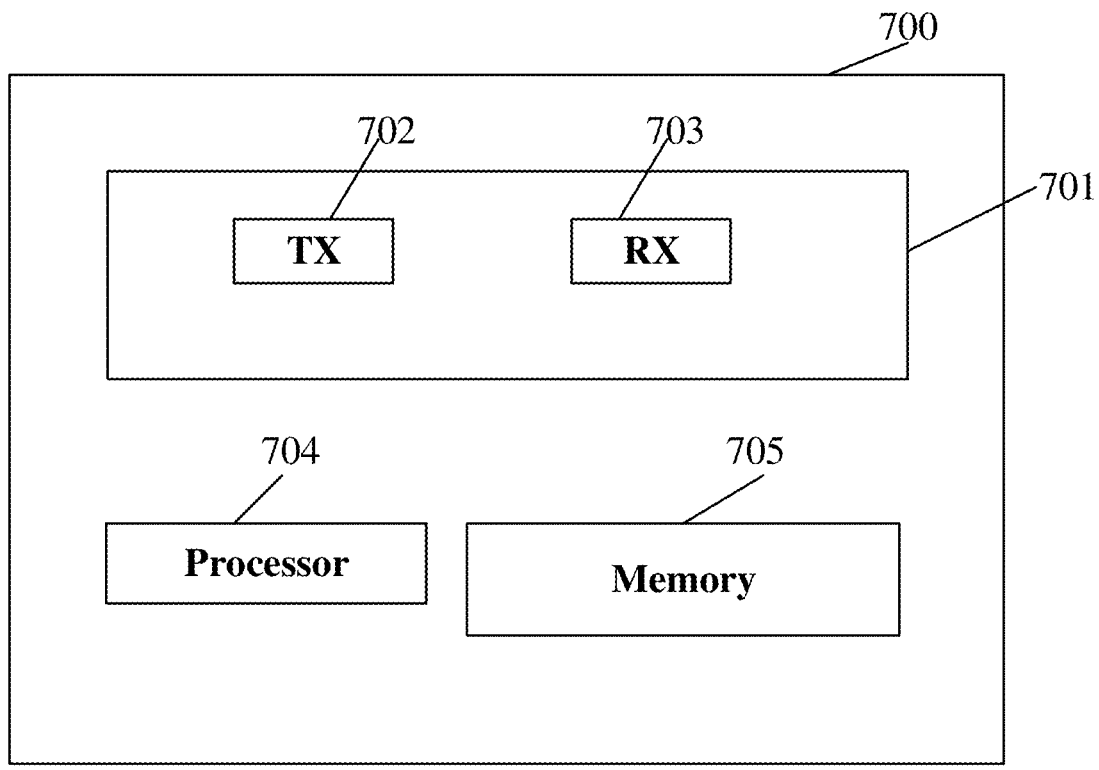
FIG. 7 is a block diagram illustrating an apparatus according to an embodiment of the disclosure.

FIG. 7 is a block diagram illustrating an apparatus capable of implementing the methods as described above. As shown in FIG. 7, the apparatus 700 comprises a processing device 704, a memory 705, and a transceiver 701 in operative communication with the processor 704. The transceiver 701 comprises at least one transmitter 702 and at least one receiver 703. While only one processor is illustrated in FIG. 7, the processing device 704 may comprises a plurality of processors or multi-core processor(s). Additionally, the processing device 704 may also comprise cache to facilitate processing operations.

Computer-executable instructions can be loaded in the memory 705 and, when executed by the processing device 704, cause the apparatus 700 to implement the above-described methods. In particular, the computer-executable instructions can cause the apparatus 700 to process, by using a neural network, input feature maps of an image to obtain output feature maps of the image. The neural network comprises a convolution part and/or a pooling part, and an aggregation part, the convolution part and/or the pooling part are configured to process the input feature maps respectively, the convolution part comprises at least one parallel unit each of which contains two parallel paths, each path of the two parallel paths contains two cascaded convolution layers, kernel sizes of the two cascaded convolution layers of a first path of the two parallel paths are 1*k and k*1 respectively and kernel sizes of the two cascaded convolution layers of a second path of the two parallel paths are k*1 and 1*k respectively, k is a positive integer greater than 1 and k in different unit is different, the pooling part comprises at least one parallel unit each of which contains two parallel paths, each path of the two parallel paths contains two cascaded pooling layers, the two cascaded pooling layers of a first path of the two parallel paths have filters of size 1*p and p*1 respectively, the two cascaded pooling layers of a second path of the two parallel paths have filters of size p*1 and 1*p respectively, p is a positive integer greater than 1 and p in different unit is different, the aggregation part is configured to concatenate results of the convolution part and/or the pooling part to obtain the output feature maps of the image.

In an embodiment, the computer-executable instructions can cause the apparatus 700 to train the neural network by using a back-propagation algorithm.

In an embodiment, the computer-executable instructions can cause the apparatus 700 to enhance the image.

Figure 8:
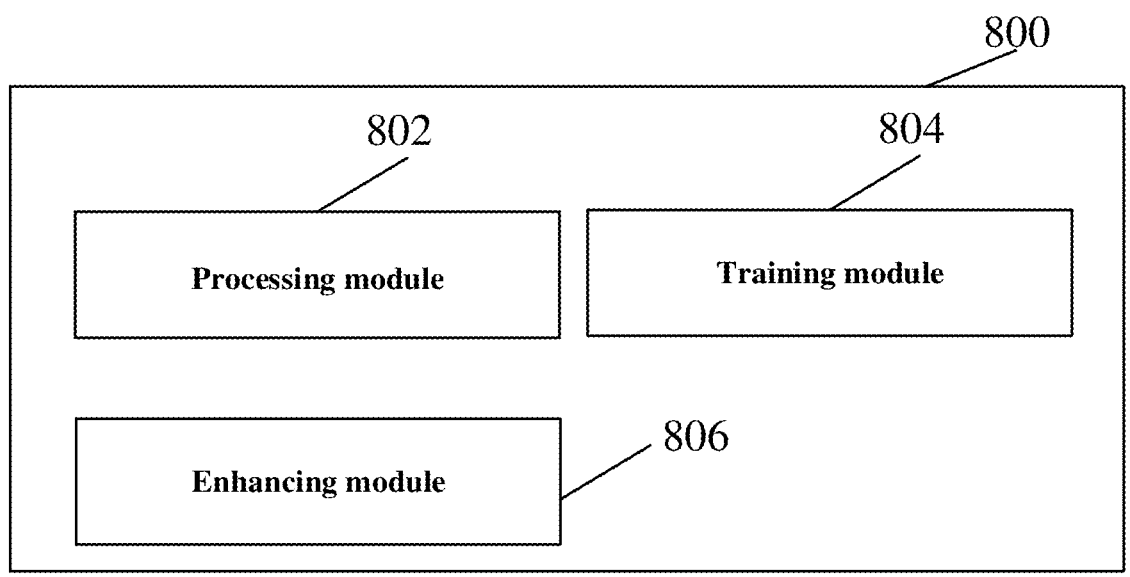
FIG. 8 is a block diagram illustrating an apparatus according to another embodiment of the disclosure.

FIG. 8 is a block diagram illustrating an apparatus capable of implementing the methods as described above. As shown in FIG. 8, the apparatus may comprise a processing module 802 for processing, by using a neural network, input feature maps of an image to obtain output feature maps of the image. The neural network comprises a convolution part and/or a pooling part, and an aggregation part, the convolution part and/or the pooling part are configured to process the input feature maps respectively, the convolution part comprises at least one parallel unit each of which contains two parallel paths, each path of the two parallel paths contains two cascaded convolution layers, kernel sizes of the two cascaded convolution layers of a first path of the two parallel paths are 1*k and k*1 respectively and kernel sizes of the two cascaded convolution layers of a second path of the two parallel paths are k*1 and 1*k respectively, k is a positive integer greater than 1 and k in different unit is different, the pooling part comprises at least one parallel unit each of which contains two parallel paths, each path of the two parallel paths contains two cascaded pooling layers, the two cascaded pooling layers of a first path of the two parallel paths have filters of size 1*p and p*1 respectively, the two cascaded pooling layers of a second path of the two parallel paths have filters of size p*1 and 1*p respectively, p is a positive integer greater than 1 and p in different unit is different, the aggregation part is configured to concatenate results of the convolution part and/or the pooling part to obtain the output feature maps of the image.

In an embodiment, the apparatus may comprise a training module 804 for training the neural network by using a back-propagation algorithm.

In an embodiment, the apparatus may comprise an enhancing module 806 for enhancing the image.

Table 1 shows segmentation results on PASCAL VOC and Cityscape datasets. PASCAL VOC and Cityscape datasets are widely used by semantic segmentation methods to evaluate their performance. DeepLabv2 is proposed by Chen L C, Papandreou G, Kokkinos I, et al, "DeepLab: Semantic Image Segmentation with Deep Convolutional Nets, Atrous Convolution, and Fully Connected CRFs", [J]. IEEE Transactions on Pattern Analysis & Machine Intelligence, 2018, 40(4):834-848. TuSimple-DUC is proposed by Panqu Wang, Pengfei Chen, Ye Yuan, Ding Liu, Zehua Huang, Xiaodi Hou, Garrison Cottrell, "Understanding convolution for semantic segmentation", arXiv preprint arXiv:1702.08502. As can be seen from Table 1, the proposed method improves the performance of scene segmentation.

TABLE 1

|  | PASCAL VOC (mIoU) | Cityscape (mIoU) |
| --- | --- | --- |
| DeepLabv2 | 79.7% | 71.4% |
| TuSimple-DUC | 83.1% | 76.2% |
| The proposed methods | 84.4% | 77.5% |

Some advantages of the embodiments of the disclosure are as follows. The proposed methods of the embodiments of the disclosure may use large kernel pooling part instead of the global pooling in the existing methods. The stride of pooling layers in the pooling part is one which can guarantee that the information of each local part in the feature map can be aggregated. Besides, the kernel of the pooling layers may be large which can make the pooling operations capture the information in a large scope. In addition, the proposed methods may adopt a new type of combination of large kernel convolutions and poolings instead of conventional combination of ASPP and global pooling. This combination can make full use of feature maps compared with the loss of information in ASPP.

It is noted that any of the components of the apparatus described above can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

Additionally, an aspect of the disclosure can make use of software running on a general purpose computer or workstation. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The flowchart and block diagrams in the figures illustrate the architecture, functionality, and operation of possible implementations of apparatus, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

In any case, it should be understood that the components illustrated in this disclosure may be implemented in various forms of hardware, software, or combinations thereof, for example, application specific integrated circuit(s) (ASICS), a functional circuitry, a graphics processing unit, an appropriately programmed general purpose digital computer with associated memory, and the like. Given the teachings of the disclosure provided herein, one of ordinary skill in the related art will be able to contemplate other implementations of the components of the disclosure.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method comprising:
  processing, by using a neural network, input feature maps of an image to obtain output feature maps of the image;
  wherein the neural network comprises an aggregation part, and one of a convolution part, a pooling part, or both the convolution part and the pooling part, and the convolution part, the pooling part or both the convolution part and the pooling part are configured to process the input feature maps respectively,
  the convolution part comprises at least one first parallel unit each of which contains two parallel paths, each path of the two parallel paths of the at least one first parallel unit contains two cascaded convolution layers, kernel sizes of the two cascaded convolution layers of a first path of the two parallel paths are 1*k and k*1 respectively and kernel sizes of the two cascaded convolution layers of a second path of the two parallel paths are k*1 and 1*k respectively, k is a positive integer greater than 1 and k in different unit is different, the pooling part comprises at least one second parallel unit each of which contains two parallel paths, each path of the two parallel paths of the at least one second parallel unit contains two cascaded pooling layers, the two cascaded pooling layers of a first path of the two parallel paths have filters of size 1*p and p*1 respectively, the two cascaded pooling layers of a second path of the two parallel paths have filters of size p*1 and 1*p respectively, p is a positive integer greater than 1 and p in different unit is different, the aggregation part is configured to concatenate results of the convolution part, the pooling part, or both the convolution part and the pooling part to obtain the output feature maps of the image.

2. The method according to claim 1, wherein the neural network further comprises a first convolution layer connected with the at least one second parallel unit of the pooling part and configured to reduce a number of channels of input feature maps of the image.

3. The method according to claim 2, wherein the first convolution layer, the second convolution layer, or both the first convolution layer and the second convolution layer have a kernel size of 1*1.

4. The method according to claim 1, wherein the neural network further comprises a second convolution layer connected with the aggregation part and configured to reduce a number of channels of feature maps output by the aggregation part.

5. The method according to claim 1, wherein the neural network further comprises an upsampling block connected with the second convolution layer and configured to upsample the feature maps output by the second convolution layer to a same size of the image.

6. The method according to claim 5, wherein the upsampling block is implemented by using Dense Upsampling Convolution.

7. The method according to claim 1, wherein the neural network further comprises a softmax layer connected with the upsampling block and configured to obtain a prediction from the feature maps output by the upsampling block.

8. The method according to claim 1, wherein the neural network further comprises a base neural network configured to process the image to obtain the input feature maps of the image.

9. The method according to claim 8, wherein the base neural network comprise one of ResNet neural network, DenseNet neural network, Xception neural network and VGG neural network.

10. The method according to claim 1, further comprising:
training the neural network by using a back-propagation algorithm.

11. The method according to claim 1, further comprising enhancing the image.

12. The method according to claim 1, wherein the neural network is used for at least one of image classification, object detection and semantic segmentation.

13. The method according to claim 1, wherein a stride of the pooling used in the pooling part is 1.

14. A non-transitory computer readable medium having encoded thereon statements and instructions, which when executed by a processor, cause the processor to perform method according to claim 1.

15. An apparatus, comprising:
at least one processor;
at least one memory including computer program code, the memory and the computer program code configured to, working with the at least one processor, cause the apparatus to process, by using a neural network, input feature maps of an image to obtain output feature maps of the image;
wherein the neural network comprises an aggregation part, and one of a convolution part, a pooling part, or both the convolution part and the pooling part, and the convolution part the pooling part, or both the convolution part and the pooling part are configured to process the input feature maps respectively,
the convolution part comprises at least one first parallel unit each of which contains two parallel paths, each path of the two parallel paths of the at least one first parallel units contains two cascaded convolution layers, kernel sizes of the two cascaded convolution layers of a first path of the two parallel paths are 1*k and k*1 respectively and kernel sizes of the two cascaded convolution layers of a second path of the two parallel paths are k*1 and 1*k respectively, k is a positive integer greater than 1 and k in different unit is different,
the pooling part comprises at least one second parallel unit each of which contains two parallel paths, each path of the two parallel paths of the at least one second parallel unit contains two cascaded pooling layers, the two cascaded pooling layers of a first path of the two parallel paths have filters of size 1*p and p*1 respectively, the two cascaded pooling layers of a second path of the two parallel paths have filters of size p*1 and 1*p respectively, p is a positive integer greater than 1 and p in different unit is different,
the aggregation part is configured to concatenate results of the convolution part, the pooling part, or both the convolution part and the pooling part to obtain the output feature maps of the image.

* * * * *